No. 2,951,085
Patented Aug. 30, 1960

2,951,085

TETRAMETHYL TITANIUM AND PROCESS OF PREPARING SAME

Karl Clauss, Kelkheim-Hornau (Taunus), and Claus Beermann, Frankfurt am Main, Germany, assignors to Farbwerke Hoechst Aktiengesellschaft vormals Meister Lucius & Bruning, Frankfurt am Main, Germany, a corporation of Germany No Drawing. Filed Apr. 12, 1957, Ser. No. 652,382

Claims priority, application Germany Apr. 14, 1956

7 Claims. (Cl. 260—429.5)

The present invention relates to organo-titanium compounds and a process of preparing them.

In spite of numerous attempts, it has hitherto been impossible to prepare organo-metal titanium compounds in which one or more alkyl groups are linked to the metal atom. It has, for example, been tried to prepare alkyl metal compounds of titanium by causing the ethereal solutions of magnesium alkyl halides or lithium alkyls to act upon titaniumtetrachloride. Such reactions did, however, not lead to the expected organo-metal titanium compounds. Instead, the transition of the tetravalent titanium to a lower valence was observed. From the course of the reaction it was suggested that a titanium alkyl halide, for example $RTiCl_3$, was intermediately formed which, however, was not capable of existence and decomposed very rapidly according to the equation $$RTiCl_3 \rightarrow TiCl_3 + R'$$

Since all attempts to prepare titanium alkyls failed, it was generally assumed that, like in the other so-called transition metals, a combination of titanium and alkyl radicals which is capable of existence is not possible.

Now we have found that tetramethyltitanium can be obtained by reacting compounds of the formula $$Ti-Z_4$$

wherein Z represents a halogen or an alkoxy radical and $TiZ_4$ is preferably titanium tetrachloride, with methyl compounds of the metals of main-group I or II of the periodic table, i.e. of the alkali metals or alkaline earth metals, at temperatures below about 0° C., suitably in the presence of a diluent which preferably is an ether or a mixture containing at least one ether.

As metal alkyls there can be used for the reaction according to the invention the methyl compounds of the alkali metals, for example of sodium or potassium, preferably methyl lithium. There can also be employed the methyl compounds of group II of the periodic table such as beryllium dimethyl, preferably dimethylmagnesium or methylmagnesium halides. Suitable titanium halides are, for example, the chloride, bromide or iodide, as alkoxy groups there come mainly into consideration those containing 1–4 carbon atoms such as methoxyl, ethoxyl, butoxyl or isobutoxyl. If desired, the alkoxy groups may contain higher alkyl radicals, for example the ethylhexyl radical or the dodecyl radical.

The process of the invention is advantageously carried out using an ether as diluent and proceeding at a temperature below about 0° C., or more advantageously below −10° C., preferably at −50° C. to −80° C., with the exclusion of air and moisture. From the reaction mixture so obtained the tetramethyltitanium can be distilled off at a low temperature under reduced pressure together with the ether used as diluent. The solution can be further concentrated by distillation.

If a content of inorganic salts of the solution does not interfere with the further use of the tetramethyltitanium, the distillation can be dispensed with and the crude solution can be used, in which case a small portion of methyl compounds of group I or II of the periodic table which may be present in the solution is destroyed by introducing carbon dioxide at −80° C. or by introducing solid carbon dioxide.

As ethers come into consideration those which are liquid under the reaction conditions, for example dimethyl ether, diethyl ether, dipropyl ether, diisopropyl ether, dibutyl ether, tetrahydrofuran or dioxan.

Solutions of tetramethyltitanium decompose on the addition of water with evolution of 4 mols of methane for each mol of titanium compound and separation of titanic acid:

$$Ti(CH_3)_4 + 4H_2O \rightarrow Ti(OH)_4 + CH_4$$

When an excess of titanium tetrachloride is used in the reaction, 1 mol of tetramethyltitanium yields 4 mols of titanium-(III)-chloride, in which case methyltitanium trichloride is intermediately formed which can be further decomposed, for example by heating.

$$Ti(CH_3)_4 + TiCl_4 \rightarrow 4(CH_3)TiCl_3 \rightarrow TiCl_3 + 4CH_3$$

This method can be used for analytic determination. Furthermore the tetramethyltitanium reacts with iodine according to the following equation $$Ti(CH_3)_4 + 4I_2 \rightarrow TiI_4 + 4CH_3I$$

This method can also be used for analytic determination.

When carrying out the process of the invention the same working methods are used as in the preparation of other organo-metal compounds, i.e. inter alia with the exclusion of air, for example under an atmosphere of nitrogen or another inert gas, and with the exclusion of moisture.

At temperatures below −50° C. the tetramethyltitanium does not substantially react with gaseous or solid carbon dioxide. This renders it possible to destroy the more reactive methyl compounds of the elements of group I or II of the periodic table used for the preparation, without the tetramethyltitanium being affected by this destruction.

At not too low a temperature tetramethyltitanium reacts with carbonyl compounds such as aldehydes and ketones to yield an alcohol, for example $$R_2C=O \xrightarrow{Ti(CH_3)_4} R_2C\begin{smallmatrix}CH_3\\OH\end{smallmatrix}$$

The reaction with Michler's ketone, known as Gilman test (H. Gilman and F. Schulze, Am. Soc. 47, 2002 (1925)), is a suitable qualitative proof for tetramethyltitanium.

Due to their low thermostability, tetramethyltitanium solutions must be stored at low temperatures. At room temperature, spontaneous decomposition occurs after a short time with separation of a black precipitate forming a thin layer (mirror) at the wall of the vessel. The black products formed by the decomposition are in part pyrophoric. The tetramethyltitanium and the decomposition products can be used as catalysts, for example for the polymerization of olefins. The following examples serve to illustrate the invention but they are not intended to limit thereto:

*Example 1*

In a 250 ml. vessel provided with a stirrer and filled with pure nitrogen, 80 ml. of absolute diethyl ether were cooled to −80° C. in a cooling bath and 1.7 ml. (15.5 millimols) of titanium tetrachloride were then added dropwise. During this procedure the ether complex of titanium tetrachloride separated in the form of a light-colored yellow crystalline precipitate.

To this suspension 65 ml. of ethereal 1.0 molar methyllithium solution from methyl iodide were added dropwise within 1 hour, while cooling well (—80° C.) and stirring vigorously. After initial darkening, the mixture turned orange-red and towards the end of the reaction assumed a green coloration. Stirring was continued for 30 minutes at —80° C., the cooling medium was then withdrawn and the solvent was distilled off under reduced pressure into a valve cooled to —80° C. As soon as the distillate showed a yellow coloration, the receiver was replaced and the solution of tetramethyltitanium in ether which solution subsequently distilled over was collected separately. Care had to be taken that the temperature of the whole apparatus remained below —10° C., since otherwise decomposition was liable to occur. In this manner, 40–50 ml. of a yellow ethereal solution were obtained which contained, in 1 ml., 0.16 millimol of tetramethyltitanium and was completely free from chlorine and lithium. By cautious vacuum distillation at low temperatures, the solution could be concentrated. The yield amounted to about 50% of the theoretical.

The ethereal solution of tetramethyltitanium showed a strongly positive Gilman test and decomposed vigorously with water with evolution of 4 mols of methane for each mol of titanium compound.

At room temperature the tetramethyltitanium decomposed with a black coloration and formation of a shining mirror at the wall of the vessel. The black decomposition products were in part pyrophoric. In order to avoid decomposition the ethereal solution was to be stored at a low temperature with the exclusion of light and moisture.

*Analysis.*—1 ml. of the aforesaid ethereal solution contained 7.65 mg. of titanium (0.16 mg.-atom); by hydrolysis there were obtained from the said solution 14.4 ml. of methane (at 0° C. under a pressure of 760 millimeters of mercury; 0.64 millimol). 1 ml. of the ethereal solution consumed 12.85 ml. of 0.1 N-iodine solution (corresponding to 0.64 millimol of Ti—CH$_3$— bonds).

*Example 2*

In a 500 ml. vessel provided with a stirrer, 6.0 ml. (54.5 millimols) of titanium tetrachloride were added, under an atmosphere of dry nitrogen, to 120 ml. of absolute butyl ether and the yellow mixture obtained was rapidly cooled to —80° C. while stirring. In the course of 1 hour 90 ml. of a 2.5 molar suspension of methyllithium (from methyl chloride) in butyl ether were added dropwise and the reaction mixture which had turned brownish was allowed to stand overnight at temperatures at —50° C. A deep violet suspension was obtained. In order to destroy the small excess of methyllithium, a few grains of dry solid carbon dioxide were added to the mixture and the whole was stirred. The precipitate consisting of lithium chloride was allowed to deposit, and a clear solution was obtained which showed a strongly positive Gilman test and after titration with iodine contained 0.2 millimol of tetramethyltitanium in 1 ml. The yeld amounted to about 75% of the theoretical.

*Example 3*

As described in Example 1, 60 ml. of a 1.3 molar solution of methylmagnesium-iodide in ether were added dropwise at —80° C. to a suspension of 18 millimols of the ether complex of titaniumtetrachloride (2.0 ml. of titaniumtetrachloride) in 100 ml. of absolute ethyl ether. Already after a few drops the mixture turned dark violet and after addition of half the quantity it assumed an orange coloration. After the total amount had been added, the mixture as stirred for a further 15 minutes without the reaction vessel being cooled; during this procedure the mixture turned green. The tetramethyltitanium was then distilled off together with the ether under reduced pressure as described in Example 1. There was obtained a clear, strongly yellow colored solution which was free from magnesium and halogen and showed a strongly positive Gilman test. By cautious vacuum distillation the solution could be concentrated to oily consistency. The color was then orange. Yield: about 40% of tetramethyltitanium.

We claim:

1. In a process wherein a titanium tetrahalide, the halogen of which has an atomic weight of 35 to 137, is reacted with a member selected from the group consisting of methyl alkali metal, dimethyl alkaline earth metal, and a methyl alkaline earth metal halide with the exclusion of air and moisture, the improvement comprising conducting the reaction at a temperature of —50 to —80° C. and recovering tetramethyl titanium from the reaction mixture by distillation.

2. Process of claim 1 wherein the reaction is conducted in a liquid ether diluent.

3. Process of claim 1 wherein the titanium tetrahalide is reacted with methyl lithium.

4. The process of claim 1 wherein the titanium tetrahalide is reacted with methyl magnesium halide, the halogen of which has an atomic weight of 35 to 137.

5. Process of claim 4 wherein said methyl magnesium halide is methyl magnesium iodide.

6. A process for the manufacture of tetramethyl titanium which comprises reacting titanium tetrachloride with methyl lithium at a temperature in the range of from about —50° C. to about —80° C. under anhydrous conditions and with the exclusion of air, and recovering the tetramethyl titanium product by distillation.

7. Tetramethyl titanium of the formula Ti(CH$_3$)$_4$.

References Cited in the file of this patent

Gilman et al.: I, "J. Organic Chem.," 10, 505–515 (1945).

Gilman et al.: II. "J.A.C.S." 76, 3615–3617 (1954).